(12) United States Patent
Habenschaden

(10) Patent No.: US 9,366,335 B2
(45) Date of Patent: Jun. 14, 2016

(54) SHIFT BY WIRE SYSTEM

(75) Inventor: Josef Habenschaden, Kohlberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 129 days.

(21) Appl. No.: 14/241,368

(22) PCT Filed: Aug. 6, 2012

(86) PCT No.: PCT/EP2012/065311
§ 371 (c)(1),
(2), (4) Date: Apr. 7, 2014

(87) PCT Pub. No.: WO2013/029923
PCT Pub. Date: Mar. 7, 2013

(65) Prior Publication Data
US 2014/0236435 A1 Aug. 21, 2014

(30) Foreign Application Priority Data
Sep. 2, 2011 (DE) .......... 10 2011 082 033

(51) Int. Cl.
*F16H 59/10* (2006.01)
*F16H 59/02* (2006.01)
*F16H 61/12* (2010.01)
*F16H 59/04* (2006.01)

(52) U.S. Cl.
CPC .......... *F16H 59/105* (2013.01); *F16H 59/0204* (2013.01); *F16H 61/12* (2013.01); *F16H 59/044* (2013.01); *F16H 2061/1208* (2013.01); *F16H 2061/1224* (2013.01); *F16H 2061/1268* (2013.01); *F16H 2061/1284* (2013.01)

(58) Field of Classification Search
None
See application file for complete search history.

(56) References Cited

U.S. PATENT DOCUMENTS

| 6,139,468 A * | 10/2000 | Goates ................... F16H 59/105 477/906 |
| 2007/0129210 A1* | 6/2007 | Kimura ................... B60R 25/06 477/97 |

(Continued)

FOREIGN PATENT DOCUMENTS

| DE | 19963782 B4 | 7/2001 |
| DE | 10036601 A1 | 2/2002 |
| DE | 10030085 A1 | 3/2002 |

(Continued)

OTHER PUBLICATIONS

International Search Report and Written Opinion from corresponding International Patent Application PCT//EP2012/065311, dated Nov. 8, 2012 (German Language).

(Continued)

*Primary Examiner* — Edwin A Young
(74) *Attorney, Agent, or Firm* — Brinks Gilson & Lione

(57) ABSTRACT

A shift by wire system for a motor vehicle, having a transmission control device and an actuation assembly, operationally connected thereto via an electrical connection. The actuation assembly is designed to generate a signal relating to an intention of the driver, corresponding to a position of the gearshift lever, by means of a gearshift lever and at least one sensor. The actuation assembly also has a controller unit, by means of which data based on the signal is communicated to the transmission control device via the electrical connection. The transmission control device monitors, in a remote manner, the controller unit in the actuation assembly via the electrical connection. The electrical connection is both a communication line for the data based on the signal and for the remote monitoring.

17 Claims, 1 Drawing Sheet

(56) References Cited

U.S. PATENT DOCUMENTS

| | | | | |
|---|---|---|---|---|
| 2011/0040462 | A1* | 2/2011 | Jerger | F16H 59/105 701/60 |
| 2011/0112736 | A1* | 5/2011 | Nakade | B60T 13/662 701/58 |

FOREIGN PATENT DOCUMENTS

| | | |
|---|---|---|
| DE | 102005008383 A1 | 9/2005 |
| DE | 102006008575 A1 | 8/2007 |
| DE | 102008029892 A1 | 12/2009 |
| DE | 102008029891 A1 | 2/2010 |

OTHER PUBLICATIONS

International Search Report from corresponding International Patent Application PCT//EP2012/065311, dated Nov. 8, 2012 (English Language).

German Office Action for DE 102011082033.7, dated Apr. 4, 2012 (German Language).

\* cited by examiner

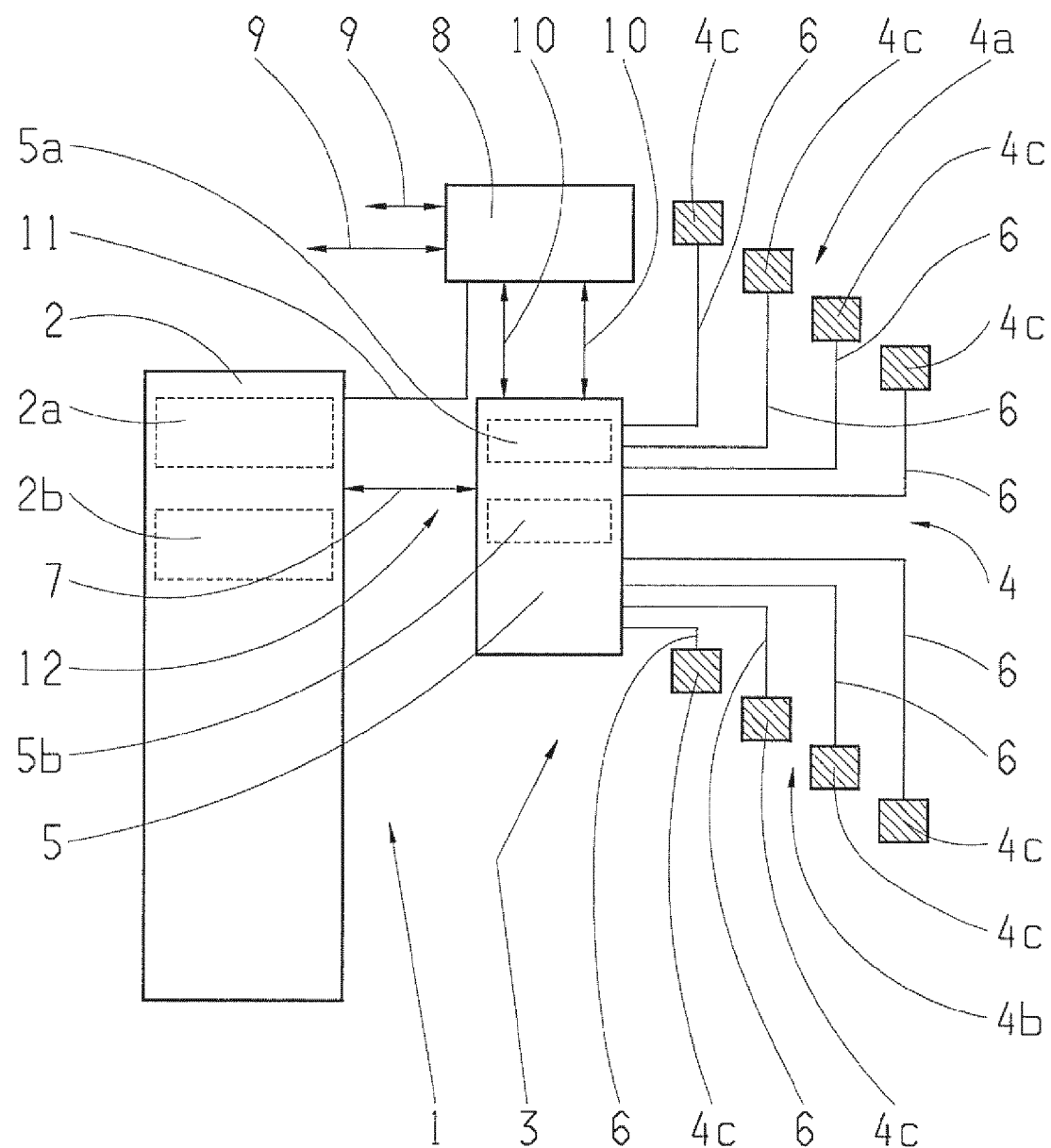

SHIFT BY WIRE SYSTEM

This application is the U.S. National Stage under 35 U.S.C. §371 of International Patent Application PCT/EP2012/065311, filed Aug. 6, 2012, which claims the priority of DE 102011082033.7, filed Sep. 2, 2011. These applications are incorporated by reference herein in their entirety.

The present invention concerns a shift by wire system according to the preamble of Claim 1, in particular, for a motor vehicle.

Shift by wire systems for motor vehicles are sufficiently known in the prior art, e.g. from DE 10 2005 008 383 A1, which describes an actuation means for use with a shift by wire shift device.

Systems of this type have an actuation assembly, e.g. gearshift lever module, for interaction with the driver, which provides a shifting, or gearshift lever for this purpose. By means of the gearshift lever and an associated sensor of the actuation assembly, the intention of the driver regarding an operating state that is to be depicted by the transmission can be detected and transmitted to the transmission control device. For the transmission thereof, systems of this type make use of powerless, in particular, purely electrical, transmission paths, i.e. "by wire."

With modern systems it is generally typical to connect the actuation assembly to the control device of the transmission control by means of a CAN bus, or a CAN interface thereof, in order to transmit the necessary positional data regarding the gearshift lever to the control device, or to create the operative connection, respectively. A solution of this type is disclosed, for example, in DE 199 63 782 B4. In order to ensure the necessary protection against a malfunction, safety components are typically provided in the actuation assembly, in particular in the form of a co-controller or a watchdog, which monitor the controller providing the data to be transmitted via the CAN bus.

The disadvantage with this is that a system architecture of this type is complex and expensive.

An electronic transmission control of this type is known from DE 100 30 085 A1, having separate control processors for the control of the transmission actuator on one hand, and other transmission functions on the other hand. These control processors are coupled to one another such that they monitor one another regarding the correct functioning thereof.

Based on this, the present invention addresses the objective of providing a shift by wire system that can be implemented with a simple construction and, in particular, is cost-effective.

This objective is attained in accordance with the invention by means of the features of Claim 1. Advantageous embodiments and developments are the subject matter of the dependent Claims.

In accordance with the invention, a shift by wire system is proposed for a motor vehicle, wherein the shift by wire system, in particular, can be provided for use with an automated transmission, e.g. an automated gearshift transmission or a variable gear ratio transmission, or a CVT transmission of the motor vehicle.

The shift by wire system exhibits a transmission control device, or a TCU, respectively, as well as an actuation assembly, operationally connected thereto, or capable of interacting therewith, via an electrical connection. The transmission control device can be a component of a mechatronic transmission control, in particular an integrated mechatronic transmission control, wherein the control circuit for the transmission control device is preferably implemented by means of a microcontroller in the transmission control device.

The actuation assembly, which is preferably formed as a gearshift lever module, in particular in a single-piece construction, exhibits a gearshift lever, or a user interaction component, respectively, and is designed such that, by means of the gearshift lever and at least one sensor, in particular a sensor array, a signal is generated in relation to an intention of the driver corresponding to a gearshift lever position. For this, the sensors can be, e.g. echo sensors, inductive sensors, sliding contacts, optical sensors, end contact circuits or other sensors, as well as combinations thereof, for example, which detect the gearshift lever position, in particular in the course of an actuation, and output a corresponding measurement signal.

Furthermore, the actuation assembly exhibits a controller unit, in particular in the form of a microcontroller, which, furthermore, provides communication and evaluation functions, or, respectively, forms a communication and evaluation computer. Preferably, the controller unit can be formed by means of an ASIC.

Data based on the signal is communicated to the transmission control device by means of the controller unit, i.e. via an electrical connection. The controller unit can process or evaluate the measurement signal for this, and provides the data corresponding to the gearshift lever position to the control device in a suitable manner, wherein this data is transmitted via the electrical connection. Based on this, the transmission control device can initiate the desired transmission operational state, e.g. the activation of a gear step, or the selection of a gearing ratio.

In order to create a shift by wire system that can be implemented in a particularly inexpensive manner, it is provided that the transmission control device monitors, in a remote manner, the controller unit in the actuation assembly via the electrical connection. As a result, the expensive safety components for the actuation assembly, which monitor the controller unit in situ, provided for in the prior art, can be eliminated, without the need for substitutes thereof.

According to the invention, a communication line is provided as the electrical connection, by means of which, on one hand, a signal, based on a specific gearshift lever position desired by the driver, and on the other hand, a signal based on the remote monitoring, can be transmitted. The term signal is understood in this context to mean data transported by means of a signal, i.e. data regarding the position of the gearshift lever, and regarding the remote monitoring, is transmitted by means of signals. Both signals are thus conducted by means of a shared communication line.

Through the use of the efficient TCU controller for a monitoring of the controller unit of the actuation assembly, i.e. in the framework of a remote monitoring via the electrical connection, it is also possible to further implement other query routines in a shift by wire system, i.e. an expanded communication, which extends beyond a previously typical, simple signature query between the safety co-processor, or watchdog, and the controller unit, and in this manner, to maximize the security or system availability, respectively.

In the framework of the invention, it is provided that the transmission control device for remote monitoring implements a watchdog functionality, which is, in particular, an intelligent watchdog, and furthermore, that the control unit implements a watchdog functionality acting together with the watchdog functionality of the transmission control device. Preferably, the functionality of an intelligent watchdog is implemented by means of a challenge-response concept, or a question-answer interaction between the transmission control unit and the controller unit. For this, the transmission control device poses questions, which—transmitted via the electrical connection—are to be correctly answered on the part of the controller unit. When a malfunction has been detected, a malfunction routine provided for this can be processed, e.g. a reset can be initiated. Advantageously, a high degree of reliability can be realized by means of the intelligent watchdog.

For the remote monitoring, it is provided that the controller unit exhibits a program code, which is designed to be executed for remote monitoring, and to function together with the program code of the transmission control device executed for remote monitoring. Program code of this type can be stored in a simple manner, e.g. in a controller implemented an ASIC.

In the framework of the present invention, it is further proposed to design the electrical connection as a bus for the remote monitoring, wherein the transmission control device monitors the controller unit in a remote manner via the electrical connection designed as a bus, in particular via a LIN, a CAN or a proprietary bus.

In order to create a particularly inexpensive shift by wire system, it is provided thereby that the remote monitoring, and in particular the transmission of the data based on the intention of the driver, and relating to the position of the gearshift lever, can be implemented without an expensive CAN interface between the actuation assembly and the transmission control device. By means of a downsizing of this type, significant savings can be obtained, e.g. in that the controller components can be assembled in significantly smaller sizes, and thus be produced less expensively.

Preferably, the electrical connection, or the operative connection, respectively, is implemented by means of at least one LIN bus, in which the transmission control unit functions preferably as the master, and the controller unit as the slave, and/or by means of at least one proprietary bus. In particular, a proprietary bus enables the actual communication or interaction requirements between the transmission control unit and the controller unit to be taken into account in its implementation, and thus, to be configured accordingly and efficiently, i.e. "lean." The proprietary communication protocol for this can be stored in a simple manner, e.g. in a controller component in the form of an ASIC.

In general, it can be provided, e.g. in relation to the necessary safety level and redundancies, that the controller unit communicates the data relating to the driver's intentions to the transmission control device via an interface for a first bus system, e.g. via a proprietary bus, and is monitored in a remote manner via an interface for a second bus system, e.g. via a LIN bus. It is, of course, also conceivable to transmit the driver intention dependent data together therewith, via the bus, or the interface, respectively, for the remote monitoring. The interfaces are preferably asynchronous interfaces.

The remote monitoring can be provided by means of at least one bidirectional interface thereby, or at least two unidirectional interfaces, such that the data transfer occurs via at least one unidirectional interface, i.e. in the direction from the controller unit to the transmission control device, e.g. also via one of the interfaces for the remote monitoring. The interfaces for the transmission of the data based on the signal can, e.g. be readily implemented, advantageously, as a PWM interface.

Further features and advantages of the invention can be derived from the following description of embodiment examples of the invention, based on the FIGURE in the drawings, which show details substantial to the invention, and from the claims. The individual features can each be implemented individually or collectively in arbitrary combinations in a variation of the invention.

Preferred embodiments of the invention shall be explained in greater detail in the following, based on the attached drawing. Shown are:

FIG. 1 in an exemplary and schematic manner, a shift by wire system according to one possible embodiment of the invention.

In the following descriptions of the drawings, identical elements, or functions, respectively, are given the same reference symbols.

FIG. 1 shows, in an exemplary and schematic manner, a shift by wire system 1 having a transmission control device, or a TCU 2, for a transmission control device of a motor vehicle, as well as an actuation assembly, or a gearshift lever module 3.

The gearshift lever module 3 is designed to detect a driver's intention with respect to an operational state of the transmission, by means of an actuation element, in particular a gearshift lever, and a sensor system 4, each allocated to the gearshift lever module 3, i.e. relating to the position of the gearshift lever. In order to detect the position of the gearshift lever, the sensor system 4 exhibits a plurality of sensors, each disposed in a sensor array 4a, b, or sensors 4c, wherein, in addition to the sensor array 4a, the redundant sensor array 4b is provided for a reliable detection. The gearshift lever is not shown in FIG. 1 for reasons of clarity.

Signals, in particular measurement signals, are generated by means of the sensors 4c, which relate to the position of the gearshift lever, and are supplied via connecting lines 6 to a controller unit, or a microcontroller 5, in particular in the form of an ASIC, of the gearshift lever module 3. The microcontroller 5 processes the signals and communicates positional data based thereon to the transmission control device 2 via the electrical connection 7.

The microcontroller 5 is also monitored in a remote manner by the transmission control device 2 thereby, via the electrical connection 7. The transmission control device 2 has a program code 2a suitable for the remote monitoring, which can be stored in a memory that can be accessed by the transmission control device 2. In the same manner, the microcontroller 5 can also access a suitable program code 5a for its remote monitoring by the transmission control device 2, which is stored in a memory of the gearshift lever module 3, in particular the microcontroller 5. The program code 2a for the remote monitoring is called up by the transmission control device 2 in the framework of a routine for a question/answer interaction with the microcontroller 5, wherein the microcontroller 5 receives a question posed by the transmission control device 2 via the electrical connection 7. The question posed must be answered by the microcontroller 5—by means of the program code 5a then called up on its part—and in turn, communicate the answer to the transmission control device 2 via the electrical connection 7. The transmission control device 2 can then compare the received response with an expected response, and determine, based on the results of the comparison, whether or not the microcontroller 5 is functioning properly, i.e. thus monitoring the microcontroller. The functionality reproduced thereby is that of an intelligent watchdog. Alternative monitoring functions are also conceivable.

The microcontroller 5 is provided with energy by means of a voltage regulator 8, which obtains its energy from an on board electrical system of a motor vehicle, reference numeral 9, via supply lines 10. If the transmission control device 2 determines that there is a dysfunction, or malfunction, respectively, in the framework of its remote monitoring of the microcontroller 5, then a resetting of the microcontroller 5 can be carried out by means of interrupting the power supply to the microcontroller 5 via the voltage regulator 8, by means of which the transmission control device 2 communicates with the voltage regulator 8 via a reset connection line 11. The reset is intended thereby to restore the correct functionality of the microcontroller 5, in particular in connection with a software error.

It should be noted here that, in the framework of the present invention, it can alternatively be provided that the gearshift lever module 3, or the microcontroller 5, respectively, is provided with energy directly by the transmission control device 2. In particular, this can be provided with small spacings, between the transmission control device 2 and the gearshift lever module 3, that are to be bridged. For this, an interruption of the energy supply for the purpose of resetting the microcontroller 5 can be obtained directly, for example, by means of the transmission control device 2.

The electrical connection 7 between the microcontroller 5 and the transmission control device 2 (cf. FIG. 1) is advantageously formed in a simple manner by means of a single-wire interface 12, designed in particular as a proprietary bus. The single-wire interface 12 is executed thereby as a bidirectional interface. The positional data concerning the gearshift lever is transmitted in the direction from the microcontroller 5 to the transmission control device 2, and the remote monitoring is executed, both via the single-wire interface 12 thereby, in accordance with a proprietary communication protocol of the proprietary bus—adjusted to the communication requirements—which is implemented as a program code, both in the microcontroller 5, having the reference numeral 5*b*, as well as in the transmission control device 2, having the reference numeral 2*b*. Instead of a bidirectional interface 12, two unidirectional interfaces, for example, may be provided, in the form, for example, of a dual-wire interface.

Aside from this, further possibilities, in particular those described in the introduction, for the implementation of the electrical connection 7 are conceivable. It should be noted that the shift by wire system 1 advantageously does not require or provide for a CAN interface, or a CAN bus between the gearshift lever module 3 and the transmission control device 2, thus resulting in significantly lower component costs through the elimination of the typical CAN controller, the CAN stack and the co-controller.

REFERENCE SYMBOLS 1 shift by wire system
2 transmission control device
2*a* program code for remote monitoring
2*b* program code for proprietary communication protocol
3 actuation assembly
4 sensor system
4*a, b* sensor array
4*c* sensor
5 controller unit
5*a* program code for remote monitoring
5*b* program code for proprietary communication protocol
6 connecting line
7 electrical connection
8 voltage regulator
9 on board electrical system
10 supply lines
11 reset connection line
12 single-wire interface

The invention claimed is:

1. An automated transmission shift by wire system for a motor vehicle comprising:
   a mechatronic transmission controller comprising a transmission control device;
   a gearshift lever module comprising a gearshift lever, an actuation assembly, and at least one sensor, wherein the actuation assembly is connected to the transmission control device via an electrical connection,
   wherein the actuation assembly is designed to generate a signal using the gearshift lever and the at least one sensor,
   wherein the signal indicates a position of the gearshift lever,
   wherein the actuation assembly also comprises a controller unit that communicates data based on the signal to the transmission control device via the electrical connection, wherein the transmission control device is configured to initiate a desired transmission state through the mechatronic transmission controller based on the data,
   wherein the transmission control device remotely monitors the controller unit via the electrical connection such that components in the actuation assembly to monitor the controller unit are not required,
   wherein the electrical connection is a communication line for both the data based on the signal and for the remote monitoring.

2. The automated transmission shift by wire system according to claim 1, wherein the transmission control device implements a watchdog functionality for the remote monitoring.

3. The automated transmission shift by wire system according to claim 2, wherein the controller unit implements a watchdog functionality for the remote monitoring, wherein the controller unit watchdog functionality acts together with the watchdog functionality of the transmission control device.

4. The automated transmission shift by wire system according to claim 2, wherein the watchdog functionality is an intelligent watchdog.

5. The automated transmission shift by wire system according to claim 1, wherein the controller unit has a program code, which is designed to be executed for remote monitoring, and to function together with a program code of the transmission control device, that is executed for the remote monitoring.

6. The automated transmission shift by wire system according to claim 5, wherein the program code of the transmission control device that is executed for the remote monitoring includes a question and answer interaction.

7. The automated transmission shift by wire system according to claim 1, wherein the transmission control device remotely monitors the controller unit via the electrical connection designed as a bus.

8. The automated transmission shift by wire system according to claim 7, wherein the electrical connection designed as a bus is selected from a group consisting of a LIN bus, a CAN bus, and a proprietary bus.

9. The automated transmission shift by wire system according to claim 1, wherein the controller unit communicates with the transmission control device for the remote monitoring via a LIN bus, and transmits the data based on the signal.

10. The automated transmission shift by wire system according to claim 1, wherein the controller unit communicates the data relating to the position of the gearshift lever to the transmission control device via an interface of a first bus system, and is remotely monitored via an interface of a second bus system.

11. The automated transmission shift by wire system according to claim 1, wherein the remote monitoring occurs through at least one bidirectional interface.

12. The automated transmission shift by wire system according to claim 1, wherein the data relating to the position of the gearshift lever is transmitted to the transmission control device via at least one unidirectional interface.

13. The automated transmission shift by wire system according to claim 12, wherein the at least one unidirectional interface is a PWM interface.

14. The automated transmission shift by wire system according to claim 1, wherein the shift by wire system does not have a CAN interface in the electrical connection between the actuation assembly and the transmission control device.

15. The automated transmission shift by wire system according to claim 1, wherein the controller unit communicates with the transmission control device for the remote monitoring via a proprietary bus and transmits the data based on the signal.

16. The automated transmission shift by wire system according to claim 1, wherein the remote monitoring occurs through at least two unidirectional interfaces.

17. The automated transmission shift by wire system according to claim 1, wherein the desired transmission state includes at least one of an activation of a gear step or a selection of a gearing ratio.

* * * * *